(12) United States Patent
Auvenshine et al.

(10) Patent No.: US 10,289,324 B2
(45) Date of Patent: *May 14, 2019

(54) HARDWARE STORAGE DEVICE OPTIMIZATION

(71) Applicant: INTERNATIONAL BUSINESS MACHINES CORPORATION, Armonk, NY (US)

(72) Inventors: John J. Auvenshine, Tucson, AZ (US); Perry J. Gallo, Tucson, AZ (US); Bent B. Holst, Alleroed (DK); Mikael H. Lindstrom, Sollentuna (SE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/047,116

(22) Filed: Jul. 27, 2018

(65) Prior Publication Data

US 2018/0335966 A1 Nov. 22, 2018

Related U.S. Application Data

(63) Continuation of application No. 15/455,206, filed on Mar. 10, 2017, now Pat. No. 10,073,639.

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0689; G06F 3/0665
See application file for complete search history.

(56) References Cited

U.S. PATENT DOCUMENTS

| 7,730,363 B2 * | 6/2010 | Takezawa .......... G05B 23/0248 714/21 |
| 8,880,801 B1 | 11/2014 | Robins et al. |
| 9,063,662 B1 | 6/2015 | Ma |
| 9,141,457 B1 | 9/2015 | Ma et al. |
| 2010/0257306 A1 * | 10/2010 | Kawaguchi .......... G06F 3/0616 711/103 |
| 2017/0109083 A1 | 4/2017 | Iliadis et al. |

OTHER PUBLICATIONS

Friedman, Mark J.; List of IBM Patents or Patent Applications Treated as Related; Jul. 27, 2018; 1 page.

* cited by examiner

*Primary Examiner* — Aracelis Ruiz
(74) *Attorney, Agent, or Firm* — Schmeiser, Olsen & Watts; Maeve M. Carpenter

(57) ABSTRACT

A method and system for improving operation of a memory device is provided. The method includes detecting, via sensors, environmental factors affecting an operation of individual hardware storage devices within an array of hardware storage devices. The environmental factors are analyzed with respect to operational characteristics of the individual hardware storage devices and a resulting expected failure rate for the individual hardware storage devices is determined. Array parameters associated with a hardware configuration for the array of hardware storage devices with respect to each expected failure rate are determined and associated issues are detected. Reliability characteristics and associated risks of the array of hardware storage devices are determined and a functionality of the array of hardware storage devices is modified.

20 Claims, 5 Drawing Sheets

HARDWARE STORAGE DEVICE OPTIMIZATION

CROSS REFERENCE TO RELATED APPLICATIONS

This application is a continuation application claiming priority to Ser. No. 15/455,206 filed Mar. 10, 2017, the contents of which are hereby incorporated by reference.

FIELD

The present invention relates generally to a method for determining hardware storage device failure and in particular to a method and associated system for improving a functionality of an array of hardware storage devices by improving a reliability of at least one of the array of hardware storage devices.

BACKGROUND

Accurately identifying storage issues typically includes an inaccurate process with little flexibility. Determining malfunctions with respect to storage devices may include a complicated process that may be time consuming and require a large amount of resources. Accordingly, there exists a need in the art to overcome at least some of the deficiencies and limitations described herein above.

SUMMARY

A first aspect of the invention provides a memory device operational improvement method comprising: detecting, by a processor of a hardware device via a plurality of sensors, environmental factors affecting an operation of individual hardware storage devices within an array of hardware storage devices; first analyzing, by the processor, the environmental factors with respect to operational characteristics of the individual hardware storage devices; determining, by the processor based on results of the first analyzing, an expected failure rate for each of the individual hardware storage devices; receiving, by the processor, data describing a hardware configuration for the array of hardware storage devices; second analyzing, by the processor, array parameters associated with the hardware configuration for the array of hardware storage devices with respect to each the expected failure rate; first determining, by the processor based results of the second analyzing, a risk for data loss with respect to malfunctions of the array of hardware storage devices, an expected rebuild time for each of the individual hardware storage devices, and a number of additional hardware storage devices required for stocking due to the malfunctions; second determining, by the processor based results of the first determining, reliability characteristics and associated risks of the array of hardware storage devices; determining, by the processor, that the reliability characteristics and associated risks are not within an acceptable tolerance level; and modifying, by the processor based on the determining that the reliability characteristics and associated risks are not within the acceptable tolerance level, a functionality of the array of hardware storage devices thereby modifying an operation of at least one of the individual hardware storage devices.

A second aspect of the invention provides A computer program product, comprising a computer readable hardware storage device storing a computer readable program code, the computer readable program code comprising an algorithm that when executed by a processor of a hardware device implements a memory device operational improvement method, the method comprising: detecting, by the processor via a plurality of sensors, environmental factors affecting an operation of individual hardware storage devices within an array of hardware storage devices; first analyzing, by the processor, the environmental factors with respect to operational characteristics of the individual hardware storage devices; determining, by the processor based on results of the first analyzing, an expected failure rate for each of the individual hardware storage devices; receiving, by the processor, data describing a hardware configuration for the array of hardware storage devices; second analyzing, by the processor, array parameters associated with the hardware configuration for the array of hardware storage devices with respect to each the expected failure rate; first determining, by the processor based results of the second analyzing, a risk for data loss with respect to malfunctions of the array of hardware storage devices, an expected rebuild time for each of the individual hardware storage devices, and a number of additional hardware storage devices required for stocking due to the malfunctions; second determining, by the processor based results of the first determining, reliability characteristics and associated risks of the array of hardware storage devices; determining, by the processor, that the reliability characteristics and associated risks are not within an acceptable tolerance level; and modifying, by the processor based on the determining that the reliability characteristics and associated risks are not within the acceptable tolerance level, a functionality of the array of hardware storage devices thereby modifying an operation of at least one of the individual hardware storage devices.

A third aspect of the invention provides a computer program product, comprising a computer readable hardware storage device storing a computer readable program code, the computer readable program code comprising an algorithm that when executed by a processor of a hardware device implements a memory device operational improvement method, the method comprising: detecting, by the processor via a plurality of sensors, environmental factors affecting an operation of individual hardware storage devices within an array of hardware storage devices; first analyzing, by the processor, the environmental factors with respect to operational characteristics of the individual hardware storage devices; determining, by the processor based on results of the first analyzing, an expected failure rate for each of the individual hardware storage devices; receiving, by the processor, data describing a hardware configuration for the array of hardware storage devices; second analyzing, by the processor, array parameters associated with the hardware configuration for the array of hardware storage devices with respect to each the expected failure rate; first determining, by the processor based results of the second analyzing, a risk for data loss with respect to malfunctions of the array of hardware storage devices, an expected rebuild time for each of the individual hardware storage devices, and a number of additional hardware storage devices required for stocking due to the malfunctions; second determining, by the processor based results of the first determining, reliability characteristics and associated risks of the array of hardware storage devices; determining, by the processor, that the reliability characteristics and associated risks are not within an acceptable tolerance level; and modifying, by the processor based on the determining that the reliability characteristics and associated risks are not within the acceptable tolerance level, a functionality of the array of hardware storage devices thereby modifying an operation of at least one of the individual hardware storage devices.

The present invention advantageously provides a simple method and associated system capable of accurately identifying storage issues.

DETAILED DESCRIPTION

Figure 1:
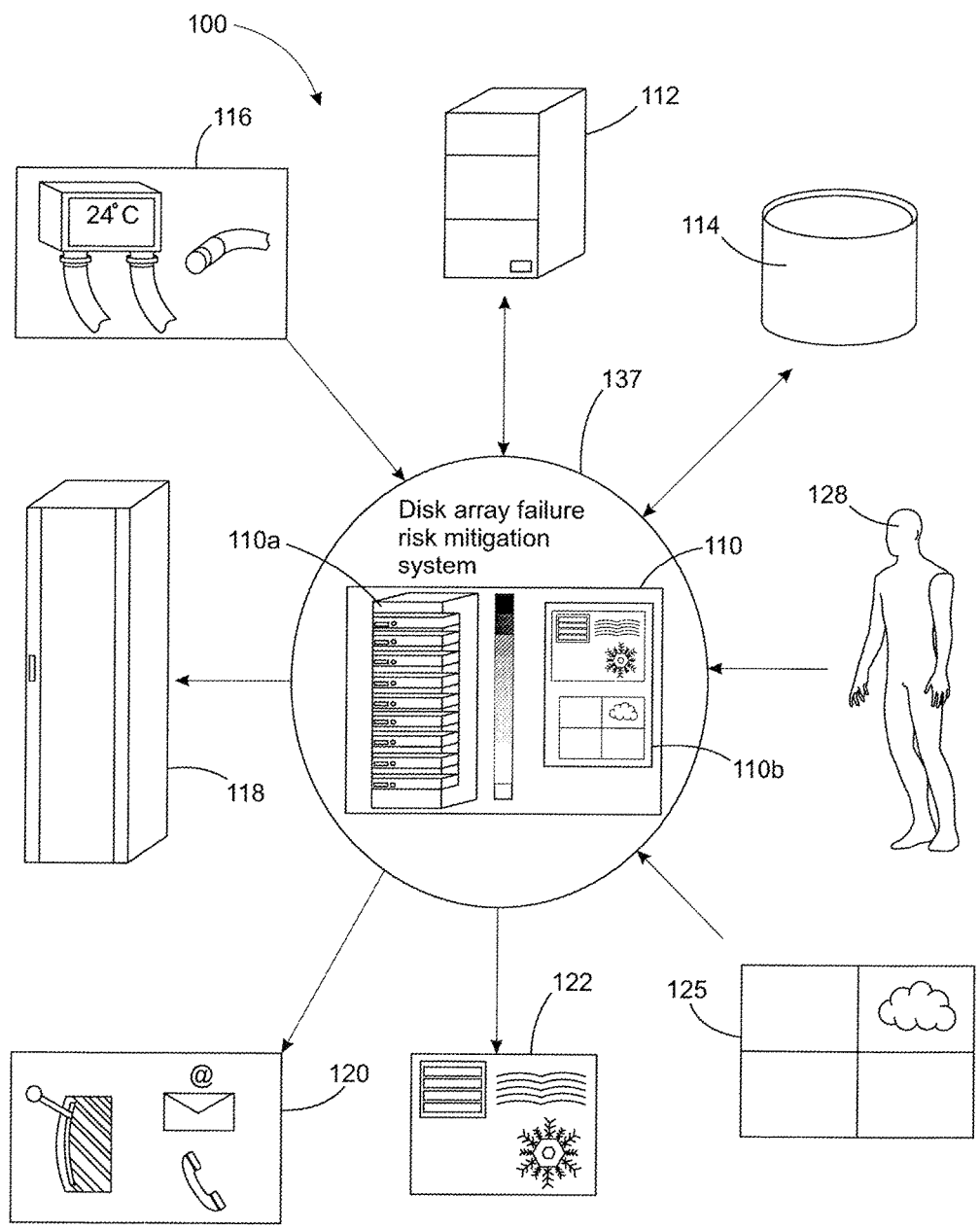
FIG. 1 illustrates a system for improving a functionality of an array of hardware storage devices by improving a reliability of at least one of the array of hardware storage devices, in accordance with embodiments of the present invention.

FIG. 1 illustrates a system 100 for improving a functionality of an array of hardware storage devices 110a by improving a reliability of at least one of the array of hardware storage devices 110a, in accordance with embodiments of the present invention. Additionally, system 100 improves parameters for the array of hardware storage devices 110a and/or environmental parameters are improved as detailed with respect to FIG. 1, infra. System 100 may comprise a disk array failure risk mitigation system 110 comprising array of hardware storage devices 110a and a storage controller 110b. System 100 is enabled to: aggregate a predicted risk for hardware storage device (hardware disk drive storage device (e.g., hardware disk drives) failures for each individual hardware storage device within array of hardware storage devices 110a; predict a risk for data loss within array of hardware storage devices 110a based on analyses of aggregated predicted risks; and determine that the array of hardware storage devices 110a requires remediation if the predicted risk for data loss exceeds a predetermined threshold.

An array of hardware storage devices 110a (e.g., a disk array) is defined herein as a hardware element (i.e., plurality of interconnected storage devices) comprising a large group of hard disk drives (HDDs) comprising several disk drive trays. Array of hardware storage devices 110a comprises architecture for improving a data storage speed and increasing data storage protection. Array of hardware storage devices 110a is enabled via a storage controller 110b for coordinating activity within the array. A disk array forms the backbone of storage networking environments. Array of hardware storage devices 110a is configured to provide increased availability, resiliency, and maintainability via usage of existing components (e.g., controllers, power supplies, fans, etc.) such that all single points of failure (SPOFs) are eliminated from the design. Array of hardware storage devices 110a may comprise the following array categories: network attached storage (NAS) arrays, storage area network (SAN) arrays, modular SAN arrays, monolithic SAN arrays, utility storage arrays, storage virtualization arrays, redundant array of independent disks (RAID), etc. A storage area network (SAN) comprises one or more disk arrays that function as a repository for data being moved in and out of the SAN. A RAID is defined herein as two or more interconnected drives for improving data storage performance and fault tolerance. A RAID comprises a data storage virtualization technology that combines multiple physical disk drive components into a single logical unit for the purposes of data redundancy, performance improvement, etc. A RAID enables the storage of data in multiple locations to protect the data against corruption and to provide the data for users quickly.

System 100 comprises environmental sensors (e.g., temperature sensors 116 in FIG. 1) and generates drive reliability data to predict individual hardware (disk) drive failure rates. Subsequently, system 100 analyzes a configuration for array of hardware storage devices 110a currently in place to calculate a risk of data loss and a time and performance impact of hardware device array rebuild operations. If a determined current combination of maintenance costs with respect to the environmental parameters and a predicted risk of data loss are determined to exceed a user threshold, system 100 determines alternative possibilities associated with modifications to the hardware device array configurations, environmental parameters, or any combination therein. Additionally, a user may optionally input acceptable risk and rebuild frequency parameters to limit alternative modification possibilities that are displayed. System 100 presents the alternative modification possibilities to the user. If only one of the alternative modification possibilities is able to be executed, system 100 may automatically implement the alternative modification. If more than one of the alternative modification possibilities is available for execution, the user may select (via a graphical user interface) one of the alternative modifications. Alternatively, system 100 may select an alternative modification with respect to a pre-established rule (e.g., a lowest feasible value at a given risk of data loss constraint, a lowest feasible risk of data loss at a given value constraint). Subsequently, system 100 enables any required changes to the hardware (disk) drive array configurations necessitated by the selected alternative modification by interfacing with all hardware storage subsystems. Additionally, system 100 is enabled to modify environmental parameters to conform to the selected alternative modification. For example, system 100 may: automatically switch to or from outside (ambient) air cooling via usage of an automatic switch, raise or lowing temperature set point (thermostat) of an HVAC system by means of electronic control, or alert an operator via a GUI console alert, email, or call out to modify environmental control changes manually.

System 100 of FIG. 1 includes array mitigation system 110 (comprising array of hardware storage devices 110a and storage controller 110b) connected through a network 137 to temperature (or any type of) sensors 116, disk array modification system 118, manual adjustment system 120, HVAC systems 122, outdoor air temperature system 125, administrator input systems 128, database systems 114, and a controller server 112. Temperature sensors 116 are configured to monitor a temperature of a structure (e.g., a room) housing array of hardware storage devices 110a as well as the components (array mitigation system 110) themselves.

Disk array modification system 118 is configured to determine disk array modifications (e.g., an array size, parity drives, spare drives, etc.). Manual adjustment system 120 comprises controls for implementing the disk array modifications via a graphical user interface (GUI). HVAC systems 122 comprise controls for automatically controlling HVAC systems based on an output from temperature sensors 116. Additionally, HVAC systems 122 comprise controls for monitoring outdoor air temperature system 125 and controlling HVAC systems based on the output. Administrator input systems 128 are configured to determine a risk level acceptability with respect to risks for data loss due to issues with array of hardware storage devices 110*a*. Database systems 114 store attributes associated with array of hardware storage devices 110*a*. For example, database systems 114 store hardware storage device locations and types, an environmental history associated with each device of array of hardware storage devices 110*a*, array configurations, device reliability characteristics, etc. Controller server 112 is configured to monitor, assess, and control all functions of array mitigation system 110. Storage controller 110*b*, temperature sensors 116 (controller), disk array modification system 118, manual adjustment system 120, HVAC systems 122, outdoor air temperature system 125, administrator input systems 128, database systems 114, and a controller server 112 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, storage controller 110*b*, temperature sensors 116 (controller), disk array modification system 118, manual adjustment system 120, HVAC systems 122, outdoor air temperature system 125, administrator input systems 128, database systems 114, and controller server 112 each may each comprise a specialized hardware device comprising specialized (non-generic) hardware and circuitry (i.e., specialized discrete non-generic analog, digital, and logic based circuitry) for (independently or in combination) executing a process described with respect to FIGS. 1-5. The specialized discrete non-generic analog, digital, and logic based circuitry may include proprietary specially designed components (e.g., a specialized integrated circuit, such as for example an Application Specific Integrated Circuit (ASIC) designed for only implementing an automated process for improving a functionality of an array of hardware storage devices 110*a* by improving a reliability of at least one of the array of hardware storage devices 110*a*. Any of storage controller 110*b*, temperature sensors 116 (controller), disk array modification system 118, manual adjustment system 120, HVAC systems 122, outdoor air temperature system 125, administrator input systems 128, database systems 114, and controller server 112 may include a memory system and software. The memory system may include a single memory system. Alternatively, the memory system may include a plurality of memory systems. Network 137 may include any type of network including, inter alia, a local area network, (LAN), a wide area network (WAN), the Internet, a wireless network, etc.

System 100 executes a process associated with predictive analytics regarding an impact of environmental conditions with respect to individual disk drive failures, risk of data loss, and recommended corrective actions. For example, the following process illustrates a predictive analytics process:

Analytics from individual disk drive predictions are retrieved and applied to additional analytics for predicting a risk for losing data within an array of disk drives. The analytics are dependent on a number of disk drives in an array, associated performance characteristics, a type of RAID being used, and a load on the array. The analytics are executed with respect to a range of array sizes and types applicable to a specified situation. Sizes and types of disk arrays for providing acceptable data protection are determined based on predicted failure rates for individual disk drives, acceptable risk levels and acceptable performance impacts from disk drive rebuild processes. In response, current environmental conditions and associated spare drives for stock replacing failed disk drives are determined. If a current combination of disk drive types, array sizes, and number of parity disk drives does not conform to an acceptable level of risk and performance characteristics, environmental and/or array changes are determined. The changes are associated with bringing risk and performance factors into an acceptable range.

System 100 enables a process for measuring multiple disk drive array operational inputs such as, inter alia, an average temperature, a peak daily temperature, a humidity level, a vibration level, a particulate level, air flow volume (e.g., within a data center, an air handler, a rack, a chassis, etc.), a type and number of disk drives, etc. The measured operational inputs are first analyzed via execution of algorithms such as, inter alia, linear regression, non-linear regression, neural networks, etc. to generate a first output associated with a number of disk drive failures, a pattern/timing of expected failures (e.g., a maximum number per day), etc. A second analysis is executed using the first output as input in combination with one or more of the following inputs: a RAID level(s) in use, a number of disk drives in an array(s), a number of hot spare disk drives available, a number of parity drive in each array, an average load on the disk array(s), average rebuild time within a disk array(s), a number of spare disk drives on hand, a speed at which failed disk drives are replaced with spare disk drives, etc.

The first analysis is executed with respect to disk drive array environmental conditions and disk drive characteristics. For example, a method for determining a potential disk drive error may include, inter alia, providing a disk drive that includes a differential pressure sensor for measuring a difference in pressure between differing portions of an enclosure housing the disk drive. The measured difference in pressure is analyzed and the analysis provides a risk assessment to determine the potential disk drive error. Alternatively, temperature or lubricant issues may be analyzed to determine the potential disk drive error.

An output from the first analysis comprises a predicted failure rate for a disk drive over time and may be expressed mathematically as R(t). For example, if an output of the first analysis determines a prediction that one disk drive out of 100 will fail in the next month, then r (i.e., month)=0.01. The second analysis may include computing a risk for data loss due to multiple disk drive failures in an disk drive array over a given time t. Therefore, an array of d data (disk) drives and p parity (disk) drives (where p>=1) with a drive rebuild rate r expressed in the same units as t may comprise an assumed infinite supply of available spare drives as follows:

$$RDL(t) = (\text{probability a drive fails} * \text{time to rebuild a failed drive}) * (\text{probability another drive fails while rebuilding})^{\wedge} \text{\# of parity drives}$$

Therefore, a probability that another disk drive fails may depend on a number of remaining healthy drives that decrement by one as each concurrent rebuild occurs. The probability may be determined programmatically via a counting loop that iterates once for each parity disk drive. For example, results may include:

$$RDL(t)=((d+1)*R(t)*(r/t))*(d*R(t)) \text{ for RAID-5 (1 parity drive)}. \qquad 1.$$

$$RDL(t)=((d+2)*R(t)*(r/t))*((d+1)*R(t))*(d*R(t)) \text{ for RAID-6 (2 parity drives)}. \qquad 2.$$

The aforementioned example results illustrate that a user may determine that a RDL(t) for a given combination of disk drive type, disk drive environment, disk drive array size, and number of parity drives is unacceptably high. Therefore, the following algorithm described with respect to FIG. 2 illustrates various array characteristics and environmental parameters that may be modified to produce an RDL(t) which is acceptable to the user.

Figure 2:
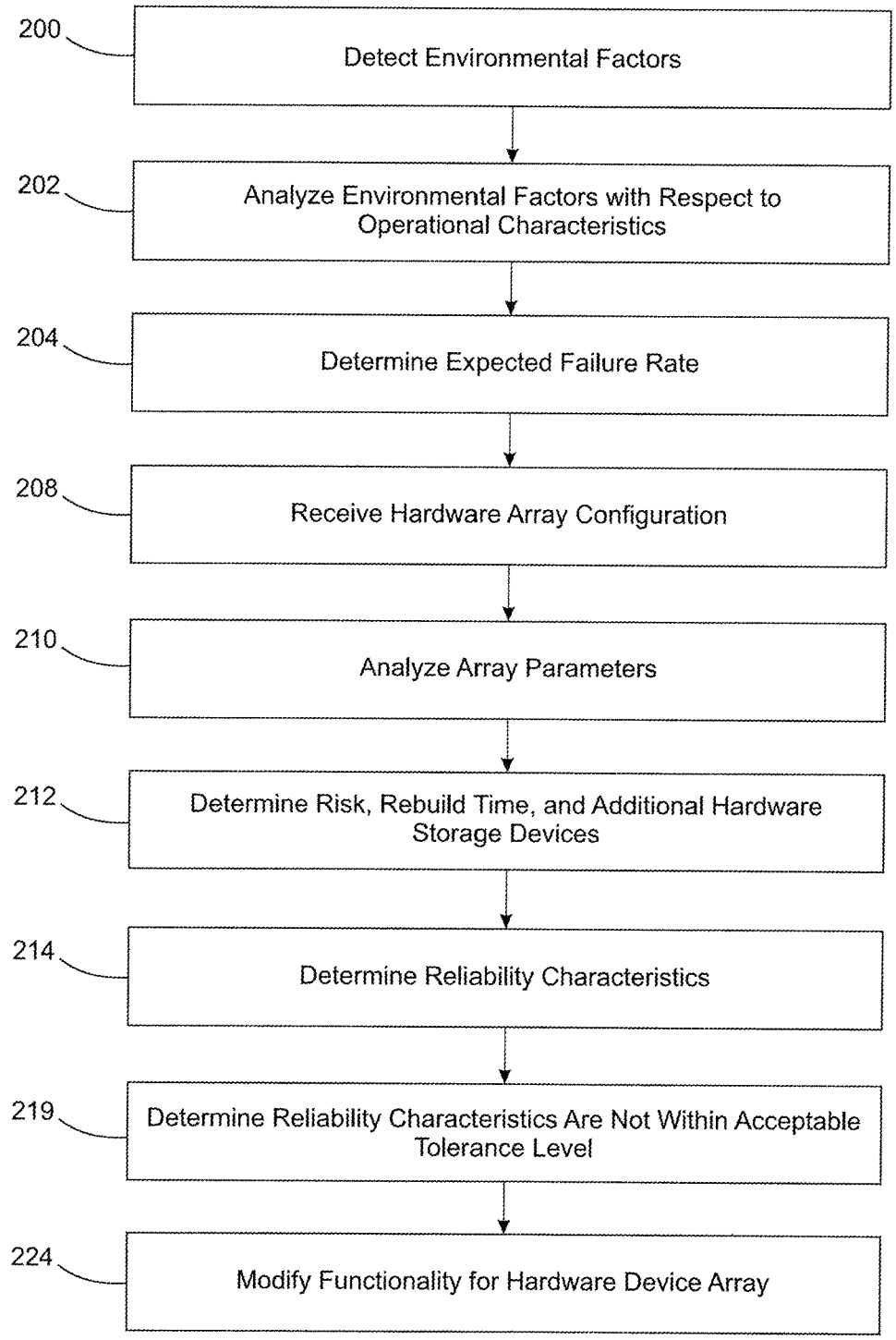
FIG. 2 illustrates an algorithm detailing a process flow enabled by the system of FIG. 1 for improving a functionality of an array of hardware storage devices by improving a reliability of at least one of the array of hardware storage devices, in accordance with embodiments of the present invention.

FIG. 2 illustrates an algorithm detailing a process flow enabled by system 100 of FIG. 1 for improving a functionality of an array of hardware storage devices 110a by improving a reliability of at least one of the array of hardware storage devices 110a, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by storage controller 110b, temperature sensors 116 (controller), disk array modification system 118, manual adjustment system 120, HVAC systems 122, outdoor air temperature system 125, administrator input systems 128, database systems 114, and a controller server 112 of FIG. 1. In step 200, environmental factors affecting an operation of individual hardware storage devices within an array of hardware storage devices are detected via a plurality of sensors. The sensors may include, inter alia, temperature sensors, humidity sensors, pressure sensors, optical sensors, etc. In step 202, the environmental factors are analyzed with respect to operational characteristics of the individual hardware storage devices. In step 204, an expected failure rate for each of the individual hardware storage devices is determined based on the analysis of step 202. In step 208, data describing a hardware configuration for the array of hardware storage devices is received. In step 210, array parameters associated with the hardware configuration for the array of hardware storage devices with respect to each expected failure rate are analyzed. In step 212, a risk for data loss with respect to malfunctions of the array of hardware storage devices, an expected rebuild time for each of the individual hardware storage devices, and a number of additional hardware storage devices required for stocking due to the malfunctions are determined based on results of the analysis of step 210. In step 214, reliability characteristics and associated risks of the array of hardware storage devices are determined based on results of step 212. In step 219, it is determined that the reliability characteristics and associated risks are not within an acceptable tolerance level. In step 224, a functionality of the array of hardware storage devices is modified (based on results of step 219) thereby modifying an operation of at least one of the individual hardware storage devices. The functionality modification process may include:

1. Receiving a plurality of predetermined groups of modification attributes associated with: the environmental factors, the hardware configuration for the array of hardware storage devices, and the reliability characteristics of the array of hardware storage devices.
2. Determining (based on user input and feedback from the plurality of sensors) if a predetermined group of the plurality of predetermined groups of modification attributes comprises an associated modification for improving the functionality of the array of hardware storage devices.

If it is determined that the predetermined group of the plurality of predetermined groups of modification attributes comprises an associated modification for improving the functionality of the array of hardware storage devices, the modification process may further include: applying the predetermined group to a control system of the hardware device and executing (via the control system) the modification in response to the applying process.

If it is determined that the predetermined group of the plurality of predetermined groups of modification attributes does not comprise an associated modification for improving the functionality of the array of hardware storage devices, the modification process may further include:

1. Executing (via a control system of the hardware device) a change to the array parameters with respect to the array of hardware storage devices. Alternatively, environmental control attributes associated with control of the environmental factors with respect to the operational characteristics of the individual hardware storage devices may be executed.
2. Modifying (via the control system) at least one array parameter and/or at least one environmental control attribute.
3. Executing the analysis of step 210 with respect to current array parameters associated with the hardware configuration for the array of hardware storage devices with respect to each expected failure rate. The original or current array parameters may include the following actions: automatically connecting a spare hardware device to the array of hardware storage devices, connecting an additional parity device to the array of hardware storage devices, reducing or enlarging the number of data drives in the array of hardware storage devices, changing the encoding or error correction scheme of the array of hardware storage devices, etc. Alternatively, current environmental factors may be executed with respect to the operational characteristics of the individual hardware storage device. The environmental control attributes may include an action associated with modifying an HVAC system for a structure housing the array of hardware storage devices. The HVAC system may be enabled to control heat functions, humidity functions, and/or airflow functions for the structure.

Figure 3:
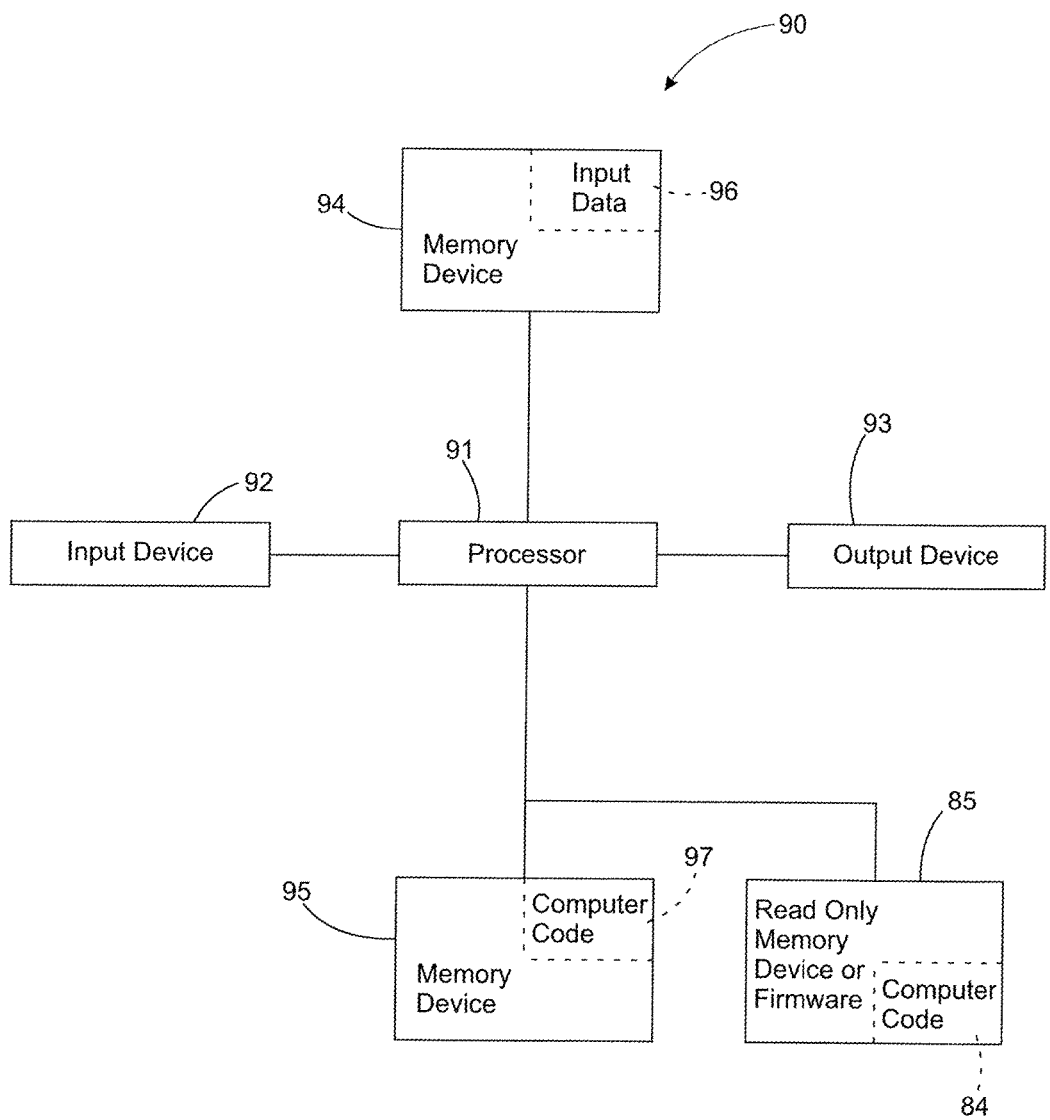
FIG. 3 illustrates a computer system used by the system of FIG. 1 for enabling a process for improving a functionality of an array of hardware storage devices by improving a reliability of at least one of the array of hardware storage devices, in accordance with embodiments of the present invention.

FIG. 3 illustrates a computer system 90 (e.g., hardware storage devices 110a, storage controller 110b, temperature sensors 116, disk array modification system 118, manual adjustment system 120, HVAC systems 122, outdoor air temperature system 125, administrator input systems 128, database systems 114, and a controller server 112 of FIG. 1) used by or comprised by the system of FIG. 1 for improving a functionality of an array of hardware storage devices by improving a reliability of at least one of the array of hardware storage devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 3 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving a functionality of an array of hardware storage devices by improving a reliability of at least one of the array of hardware storage devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 3) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve a functionality of an array of hardware storage devices by improving a reliability of at least one of the array of hardware storage devices. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving a functionality of an array of hardware storage devices by improving a reliability of at least one of the array of hardware storage devices. In another embodiment, the invention provides a business method that performs the process steps of the invention on a subscription, advertising, and/or fee basis. That is, a service supplier, such as a Solution Integrator, could offer to enable a process for improving a functionality of an array of hardware storage devices by improving a reliability of at least one of the array of hardware storage devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
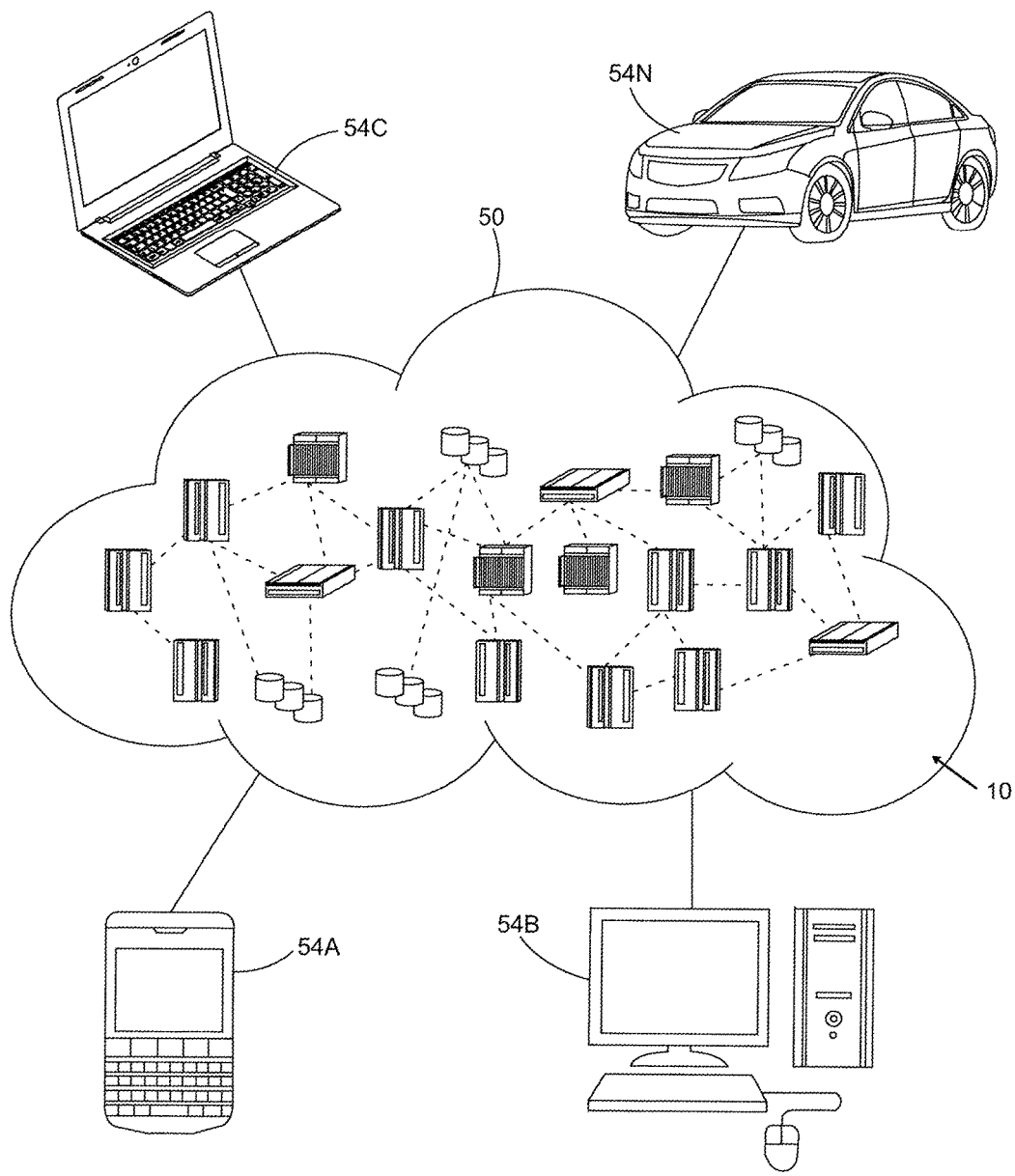
FIG. 4 illustrates a cloud computing environment, in accordance with embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 4 are intended to be illustrative only and that computing nodes 10 and cloud computing environment 50 can communicate with any type of computerized device over any type of network and/or network addressable connection (e.g., using a web browser).

Figure 5:
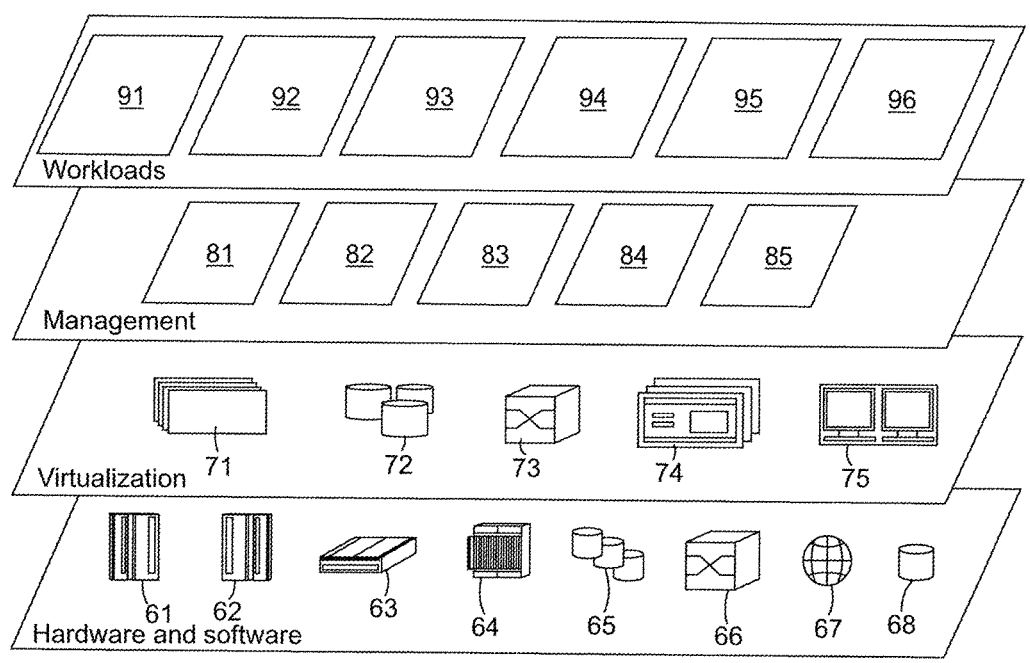
FIG. 5 illustrates a set of functional abstraction layers provided by cloud computing environment, in accordance with embodiments of the present invention.

Referring now to FIG. 5, a set of functional abstraction layers provided by cloud computing environment 50 (see FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for improving a functionality of an array of hardware storage devices by improving a reliability of at least one of the array of hardware storage devices. The array of hardware storage devices may be comprised by the cloud computing environment. Alternatively, the array of hardware storage devices may be comprised by an environment shared between legacy users and cloud computing environment users.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A memory device operational improvement method comprising:
    detecting, by a processor of a hardware device via a plurality of sensors, environmental factors affecting an operation of individual hardware storage devices within an array of hardware storage devices;
    determining, by said processor based on results of first analyzing said environmental factors with respect to operational characteristics of said individual hardware storage devices, an expected failure rate for each of said individual hardware storage devices;
    second analyzing, by said processor, array parameters associated with a hardware configuration for said array of hardware storage devices with respect to each said expected failure rate;

first determining, by said processor based on results of said second analyzing, a risk for data loss with respect to malfunctions of said array of hardware storage devices, an expected rebuild time for each of said individual hardware storage devices, and a number of additional hardware storage devices required for stocking due to said malfunctions;

second determining, by said processor based on results of said first determining, reliability characteristics and associated risks of said array of hardware storage devices;

determining, by said processor, that said reliability characteristics and associated risks are not within an acceptable tolerance level; and modifying, by said processor based on said determining that said reliability characteristics and associated risks are not within said acceptable tolerance level, a functionality of said array of hardware storage devices thereby modifying an operation of at least one of said individual hardware storage devices.

2. The method of claim 1, wherein said modifying comprises:

receiving a plurality of predetermined groups of modification attributes associated with: said environmental factors, said hardware configuration for said array of hardware storage devices, and said reliability characteristics of said array of hardware storage devices; and third determining, based on user input and feedback from said plurality of sensors, if a predetermined group of said plurality of predetermined groups of modification attributes comprises associated modification for improving said functionality of said array of hardware storage devices.

3. The method of claim 2, wherein results of said third determining indicate that said predetermined group comprises associated modification for improving said functionality of said array of hardware storage devices; and wherein said modifying further comprises:

applying said predetermined group to a control system of said hardware device; and executing, via said control system, said modifying in response to said applying.

4. The method of claim 2, wherein results of said third determining indicate that said predetermined group does not comprise associated modifications for improving said functionality of said array of hardware storage devices; and wherein said modifying further comprises:

executing, via a control system of said hardware device, said array parameters with respect to said array of hardware storage devices;

modifying, via said control system, at least one array parameter of said array parameters resulting in said modifying said functionality of said array of hardware storage devices; and executing said second analyzing with respect to current array parameters associated with said hardware configuration for said array of hardware storage devices with respect to each said expected failure rate.

5. The method of claim 4, wherein said array parameters comprise actions selected from the group consisting of automatically connecting a spare hardware device to said array of hardware storage devices, connecting an additional parity device to said array of hardware storage devices, reducing or enlarging the number of data drives in said array of hardware storage devices, and changing the encoding or error correction scheme of said array of hardware storage devices.

6. The method of claim 2, wherein results of said third determining indicate that said predetermined group does not comprise associated modification for improving said functionality of said array of hardware storage devices; and wherein said modifying further comprises:

executing, via a control system of said hardware device, environmental control attributes associated with control of said environmental factors with respect to said operational characteristics of said individual hardware storage devices;

modifying, via said control system, at least one environmental control attribute of said environmental control attributes resulting in said modifying said functionality of said array of hardware storage devices; and executing said first analyzing with respect to current environmental factors with respect to said operational characteristics of said individual hardware storage device.

7. The method of claim 6, wherein said environmental control attributes comprise an action associated with modifying an HVAC system for a structure comprising said array of hardware storage devices.

8. The method of claim 7, wherein said HVAC system controls cooling functions, humidity functions, and airflow functions for said structure.

9. The method of claim 1, wherein said array of hardware storage devices comprises a redundant array of independent disks (RAID).

10. The method of claim 1, further comprising:

providing at least one support service for at least one of creating, integrating, hosting, maintaining, and deploying computer-readable code in the control hardware, said code being executed by the computer processor to implement: said detecting, said determining said expected failure rate, said second analyzing, said first determining, said second determining, said determining that said reliability characteristics and associated risks are not within an acceptable tolerance level, and said modifying.

11. A computer program product, comprising a computer readable hardware storage device storing a computer readable program code, said computer readable program code comprising an algorithm that when executed by a processor of a hardware device implements a memory device operational improvement method, said method comprising:

detecting, by said processor via a plurality of sensors, environmental factors affecting an operation of individual hardware storage devices within an array of hardware storage devices;

determining, by said processor based on results of first analyzing said environmental factors with respect to operational characteristics of said individual hardware storage devices, an expected failure rate for each of said individual hardware storage devices;

second analyzing, by said processor, array parameters associated with a hardware configuration for said array of hardware storage devices with respect to each said expected failure rate;

first determining, by said processor based on results of said second analyzing, a risk for data loss with respect to malfunctions of said array of hardware storage devices, an expected rebuild time for each of said individual hardware storage devices, and a number of additional hardware storage devices required for stocking due to said malfunctions;

second determining, by said processor based on results of said first determining, reliability characteristics and associated risks of said array of hardware storage devices;

determining, by said processor, that said reliability characteristics and associated risks are not within an acceptable tolerance level; and modifying, by said processor based on said determining that said reliability characteristics and associated risks are not within said acceptable tolerance level, a functionality of said array of hardware storage devices thereby modifying an operation of at least one of said individual hardware storage devices.

12. The computer program product of claim 11, wherein said modifying comprises:

receiving a plurality of predetermined groups of modification attributes associated with: said environmental factors, said hardware configuration for said array of hardware storage devices, and said reliability characteristics of said array of hardware storage devices; and third determining, based on user input and feedback from said plurality of sensors, if a predetermined group of said plurality of predetermined groups of modification attributes comprises associated modification for improving said functionality of said array of hardware storage devices.

13. The computer program product of claim 12, wherein results of said third determining indicate that said predetermined group comprises associated modification for improving said functionality of said array of hardware storage devices; and wherein said modifying further comprises:

applying said predetermined group to a control system of said hardware device; and executing, via said control system, said modifying in response to said applying.

14. The computer program product of claim 12, wherein results of said third determining indicate that said predetermined group does not comprise associated modification for improving said functionality of said array of hardware storage devices; and wherein said modifying further comprises:

executing, via a control system of said hardware device, said array parameters with respect to said array of hardware storage devices;

modifying, via said control system, at least one array parameter of said array parameters resulting in said modifying said functionality of said array of hardware storage devices; and executing said second analyzing with respect to current array parameters associated with said hardware configuration for said array of hardware storage devices with respect to each said expected failure rate.

15. The computer program product of claim 14, wherein said array parameters comprise actions selected from the group consisting of automatically connecting a spare hardware device to said array of hardware storage devices, connecting an additional parity device to said array of hardware storage devices, reducing or enlarging the number of data drives in said array of hardware storage devices, and changing the encoding or error correction scheme of said array of hardware storage devices.

16. The computer program product of claim 12, wherein results of said third determining indicate that said predetermined group does not comprise associated modification for improving said functionality of said array of hardware storage devices; and wherein said modifying further comprises:

executing, via a control system of said hardware device, environmental control attributes associated with control of said environmental factors with respect to said operational characteristics of said individual hardware storage devices;

modifying, via said control system, at least one environmental control attribute of said environmental control attributes resulting in said modifying said functionality of said array of hardware storage devices; and executing said first analyzing with respect to current environmental factors with respect to said operational characteristics of said individual hardware storage device.

17. The computer program product of claim 16, wherein said environmental control attributes comprise an action associated with modifying an HVAC system for a structure comprising said array of hardware storage devices.

18. The computer program product of claim 17, wherein said HVAC system controls cooling functions, humidity functions, and airflow functions for said structure.

19. The computer program product of claim 11, wherein said array of hardware storage devices comprises a redundant array of independent disks (RAID).

20. A hardware device comprising a computer processor coupled to a computer-readable memory unit, said memory unit comprising instructions that when executed by the computer processor implements a memory device operational improvement method comprising:

detecting, by said processor via a plurality of sensors, environmental factors affecting an operation of individual hardware storage devices within an array of hardware storage devices;

determining, by said processor based on results of first analyzing said environmental factors with respect to operational characteristics of said individual hardware storage devices, an expected failure rate for each of said individual hardware storage devices;

second analyzing, by said processor, array parameters associated with a hardware configuration for said array of hardware storage devices with respect to each said expected failure rate;

first determining, by said processor based on results of said second analyzing, a risk for data loss with respect to malfunctions of said array of hardware storage devices, an expected rebuild time for each of said individual hardware storage devices, and a number of additional hardware storage devices required for stocking due to said malfunctions;

second determining, by said processor based on results of said first determining, reliability characteristics and associated risks of said array of hardware storage devices;

determining, by said processor, that said reliability characteristics and associated risks are not within an acceptable tolerance level; and modifying, by said processor based on said determining that said reliability characteristics and associated risks are not within said acceptable tolerance level, a functionality of said array of hardware storage devices thereby modifying an operation of at least one of said individual hardware storage devices.

* * * * *